USOO5600375A

United States Patent [19]
Wickstrom

[11] Patent Number: 5,600,375
[45] Date of Patent: Feb. 4, 1997

[54] RENDERING AN INTER VERSES INTRA VIDEO ENCODING DECISION BASED UPON A VERTICAL GRADIENT MEASURE OF TARGET VIDEO FRAMES

[75] Inventor: Larry Wickstrom, Beaverton, Oreg.

[73] Assignee: Intel Corporation, Santa Clara, Calif.

[21] Appl. No.: 302,595

[22] Filed: Sep. 8, 1994

[51] Int. Cl.$^6$ .................... H04N 7/30; H04N 7/32
[52] U.S. Cl. .................... 348/400; 348/401; 348/409; 348/415
[58] Field of Search .................... 348/402, 409, 348/400, 401, 415, 416, 699; H04N 7/30, 7/32

[56] References Cited

U.S. PATENT DOCUMENTS

| | | | |
|---|---|---|---|
| 4,837,618 | 6/1989 | Hatori et al. | 348/401 |
| 5,001,559 | 3/1991 | Gonzales et al. | 348/416 |
| 5,005,076 | 4/1991 | Stroppina et al. | 348/400 |
| 5,136,371 | 8/1992 | Savatier et al. | 348/402 |
| 5,237,410 | 8/1993 | Inoue | 348/409 |
| 5,260,783 | 11/1993 | Dixit | 348/401 |
| 5,353,059 | 10/1994 | Lawlor et al. | 348/398 |
| 5,387,947 | 2/1995 | Shin | 348/699 |
| 5,436,694 | 7/1995 | Hirabayashi et al. | 348/699 |
| 5,465,118 | 11/1995 | Hancock et al. | 348/420 |
| 5,486,863 | 1/1996 | Auyeung et al. | 348/415 |

Primary Examiner—Tommy P. Chin
Assistant Examiner—Vu Le
Attorney, Agent, or Firm—Blakely, Sokoloff, Taylor & Zafman

[57] ABSTRACT

A video system renders an intra versus inter encoding decision for a digitally sampled target video frame of an image scene by subdividing the target video frame into cells. Each target cell contains a set of pixel data values corresponding to the image scene. The video system determines a vertical gradient measure for each target cell, and determines an error measure between each target cell and a corresponding predicted cell of a preceding video frame. If the vertical gradient measure for a target cell is high in comparison to the error measure, then the target cell is encoded relative to the corresponding predicted cell. If the vertical gradient measure for the target cell is low in comparison to the error measure, then the target cell is encoded independent of the predicted cell. The vertical gradient measure is optimized for an intra cell encoding technique that encodes differences between pixel data values in adjacent rows of the target cell.

16 Claims, 4 Drawing Sheets

RENDERING AN INTER VERSES INTRA VIDEO ENCODING DECISION BASED UPON A VERTICAL GRADIENT MEASURE OF TARGET VIDEO FRAMES

BACKGROUND OF THE INVENTION

1. Field of the Invention

The present invention pertains to the field of video communication systems. More particularly, this invention relates to a method for selecting between intra frame video data encoding and inter frame video data encoding in a video communication system.

2. Background

Prior video communication systems commonly employ data compression techniques to enable the real-time transfer of digitized video images over a relatively low bandwidth communication line. Typically, such prior video systems perform digital sampling on a video signal generated by a video camera. Such digital sampling provides an incoming digital video bit stream from the video camera that indicates the content of the corresponding image scene.

Such a prior video system usually encodes the incoming digital video bit stream according to a variety of available data compression techniques to generate compressed video data. The compressed video data is typically transmitted to a remote video system in a video conferencing system via a communication link. Typically, a remote video system in such a video conferencing system receives the compressed video data over the communication link and decodes the compressed video data to reconstruct a decompressed version of the original digital video bit stream.

Such video data compression techniques also enable compressed data storage of video images into a mass storage device such as a disk device or a CD ROM device. Such a video system retrieves the compressed video data from the mass storage device and then typically reconstructs a decompressed version of the original digital video bit stream to drive a display device. Such compressed video data storage increases the amount of video information stored in a given area of mass storage media, thereby increasing the effective data densities of mass storage devices such as disk devices and CD ROM devices.

The original digital video bit stream sampled by such a video system typically comprises a series of video frames. Each video frame usually comprises an array of pixel data that includes color or intensity values representing the original image scene sensed by the video camera. Typically, video data compression techniques are designed to minimize the size of the compressed video frames while maintaining the best possible reconstructed video image as the compressed video frames are decoded.

Prior video systems commonly encode each incoming video frame as either an inter frame or an intra frame. Typically, an inter frame is an incoming video frame encoded relative to a preceding video frame in the series of incoming video frames. An intra frame is typically an incoming video frame encoded without a relation to any other video frame in the series of incoming video frames.

Typically, inter frame encoding is more efficient than intra frame encoding for image scenes that do not change rapidly. An encoded inter frame for a current video frame usually contains difference values that indicate differences between the pixel values of the current video frame and the corresponding pixel values of the previous video frame. Such difference values are commonly zero for consecutive video frames of a relatively constant image scene. Such zero difference values typically increase the effectiveness of data compression techniques.

On the other hand, inter frame encoding is typically less efficient than intra frame encoding if the image scene exhibits large changes between consecutive video frames. Typically, an intra frame encoding of a current video frame contains mostly non zero pixel values for all pixels of the image scene. Such a large amount of non zero values usually decrease the effectiveness of data compression techniques.

Therefore, such a video system should advantageously select whether to encode each video frame as an inter frame or an intra frame on a frame by frame basis. Some prior video systems render such an intra frame versus inter frame decision by calculating a root mean squared error measure for consecutive incoming video frames. Such a root mean squared error measure typically indicates a relative difference between a current incoming video frame and a preceding video frame. Typically in such systems, intra frame encoding is selected if the root mean squared error measure is above a predetermined threshold value.

Such root mean squared error measures usually provide a sufficient indication of the differences between a current video frame and a preceding video frame and therefore a sufficient indication of the effectiveness of inter frame encoding. Unfortunately, such root mean squared error measures fail to provide an indication of the efficiency of the intra frame encoding. As a consequence, such a prior system may select an intra frame encoding for a target video frame based upon the root mean squared error measure even though an intra frame encoding would generate even more compressed video data than an inter frame encoding.

Unfortunately, such poor inter frame versus intra frame decisions in such systems usually cause inefficient data compression, thereby increasing the communication bandwidth required by a video conferencing system. Such high bandwidth communication increases the cost of video conferencing. In addition, poor inter frame versus intra frame decisions increase the mass storage area required to store the compressed video frames, thereby increasing the cost of video data storage.

SUMMARY AND OBJECTS OF THE INVENTION

One object of the present invention is to increase the efficiency of video data compression in a video system.

Another object of the present invention is to reduce the bandwidth utilization of a communication link for a video conferencing system.

Another object of the present invention is to reduce the mass storage space required to store compressed video images in a video system.

Another object of the present invention is to increase the efficiency of video data compression by rendering an inter verses intra encoding decision based upon a vertical gradient measurement of a target video frame.

A further object of the present invention is to increase the efficiency of video data compression in a video system that encodes intra frames by subdividing target frames into target cells and by encoding each target cell relative to a row of the target frame located above the target cell.

These and other objects of the invention are provided by a video system that digitally samples a target video frame of an image scene and that subdivides the target video frame into cells for encoding. Each target cell contains a set of pixel data values corresponding to the image scene. The video system determines a vertical gradient measure for each target cell, and determines an error measure between each target cell and a corresponding predicted cell of a preceding video frame. If the vertical gradient measure for a target cell is high in comparison to the error measure, then the target cell is encoded relative to the corresponding predicted cell. If the vertical gradient measure for the target cell is low in comparison to the error measure, then the target cell is encoded independent of the predicted cell. The vertical gradient measure indicates differences between pixel data values in adjacent rows of the target cell. The target cell is encoded independent of the predicted cell by determining a difference value between each pixel data value in the target cell and a corresponding set of pixel data values in a row of the target frame located above the target cell or a row of gray level values.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 3 illustrates a target video frame which is stored in the frame buffer that and which is subdivided into a set of target cells;

FIG. 4 illustrates a predicted video frame which comprises a set of predicted cells which the encoder uses to encode an inter cell;

DETAILED DESCRIPTION

Figure 1:
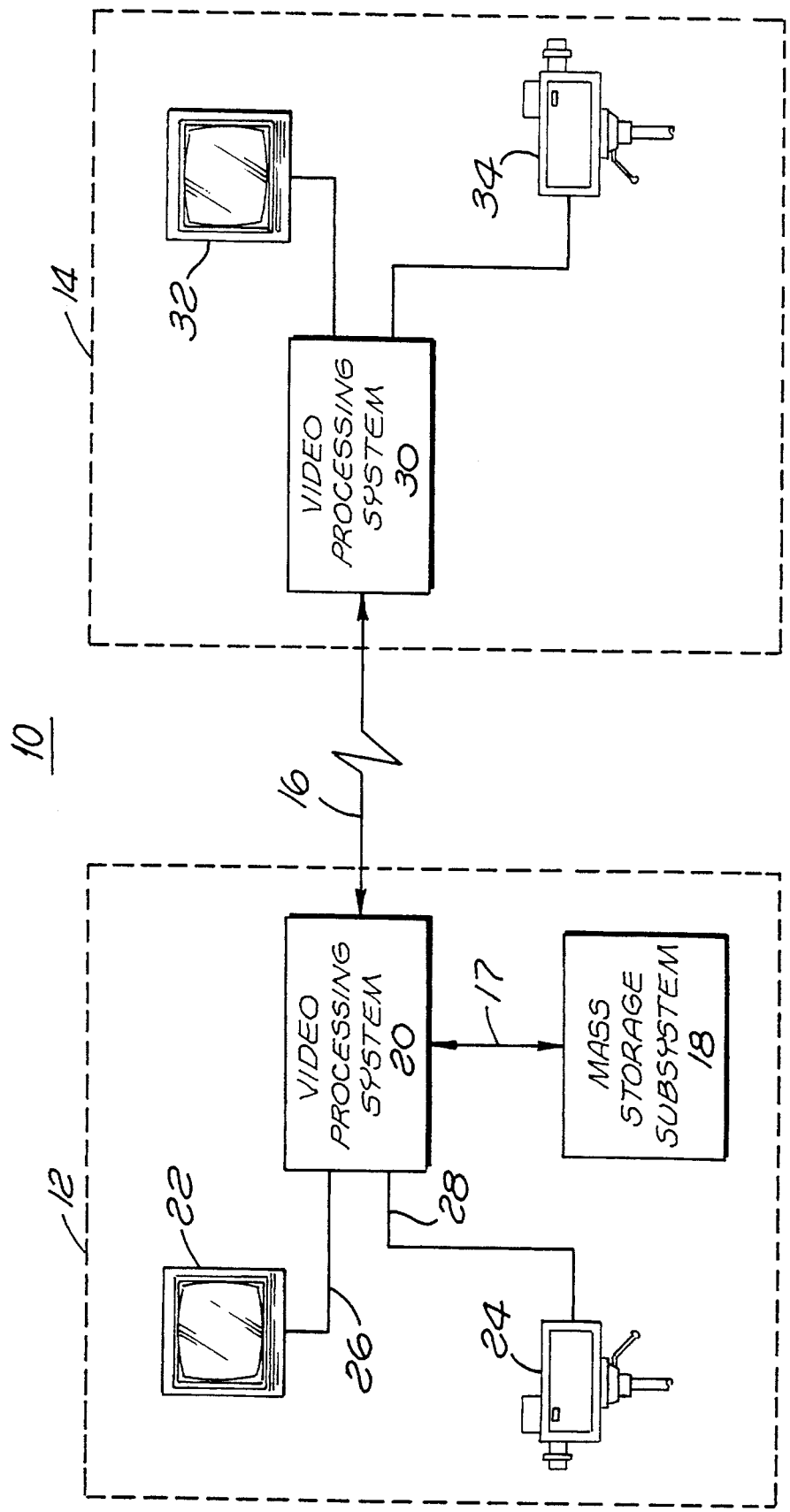
FIG. 1 illustrates a video conferencing system for one embodiment which comprises a pair of video systems that are each coupled for communication over a communication link.

FIG. 1 illustrates a video conferencing system 10 for one embodiment. The video conferencing system 10 comprises a pair of video systems 12 and 14. The video systems 12 and 14 are each coupled for communication over a communication link 16. For one embodiment, the communication link 16 is a local area network communication line. For another embodiment, the communication link 16 is a telephone line.

The video system 12 comprises a video processing system 20, a video display monitor 22, a video camera 24, and a mass storage subsystem 18. The video system 14 comprises a video processing system 30, a video display monitor 32, and a video camera 34.

The video communication system 10 provides real time video conferencing between the video systems 10 and 12 via the communication link 16. In addition, the video communication system 10 provides video playback from the mass storage subsystem 18 to either the video display monitor 22 or the video display monitor 32 via the communication link 16. The video data compression technique employed by the video processing systems 20 and 30 enable reduced bandwidth communication over the communication link 16 and reduced storage areas in the mass storage subsystem 18 for a given image scene.

For one embodiment, the video processing system 20 receives an analog video signal from the video camera 24 over a video signal line 28. The video processing system 20 performs digital sampling on the analog video signal from the video camera 24 to generate a digital video bit stream. For other embodiments, the video camera 24 comprises a digital video camera and the video signal line 28 carries a digital video bit stream.

For one embodiment, the incoming digital video bit stream from the video camera 24 comprises a series of video frames. Each video frame includes a Y plane, a U plane, and a V plane. The Y plane provides a matrix of pixel intensity values for the corresponding image scene sensed by the video camera 24. The U and the V planes provide a matrix of pixel color values the corresponding image scene.

The video processing system 20 encodes the incoming digital video bit stream from the video camera 24 according to a data compression technique. The video processing system 20 encodes the Y plane, the U plane, and the V plane of each incoming video frame independently. The video processing system 20 transmits the compressed video bit stream comprising a series of compressed frames to the video system 14 over the communication link 16.

The video processing system 20 receives the compressed video bit stream from the video system 14 over the communication link 16. The video processing system 20 decodes the compressed video bit stream according to the video data compression technique originally applied to encode the original digital video bit stream. The video processing system 20 generates a set of video signals 26 corresponding to the decompressed video bit stream. The video signals 26 drive the video display monitor 22.

In addition, the video processing system 20 transfers the compressed video bit stream for storage to the mass storage subsystem 18 over a bus 17. Thereafter, the video processing system 20 accesses the compressed video bit stream from the mass storage subsystem 18, decodes the compressed video bit stream, and generates the video signals 26 which drive the video display monitor 22 to reconstruct the original image scene.

Figure 2:
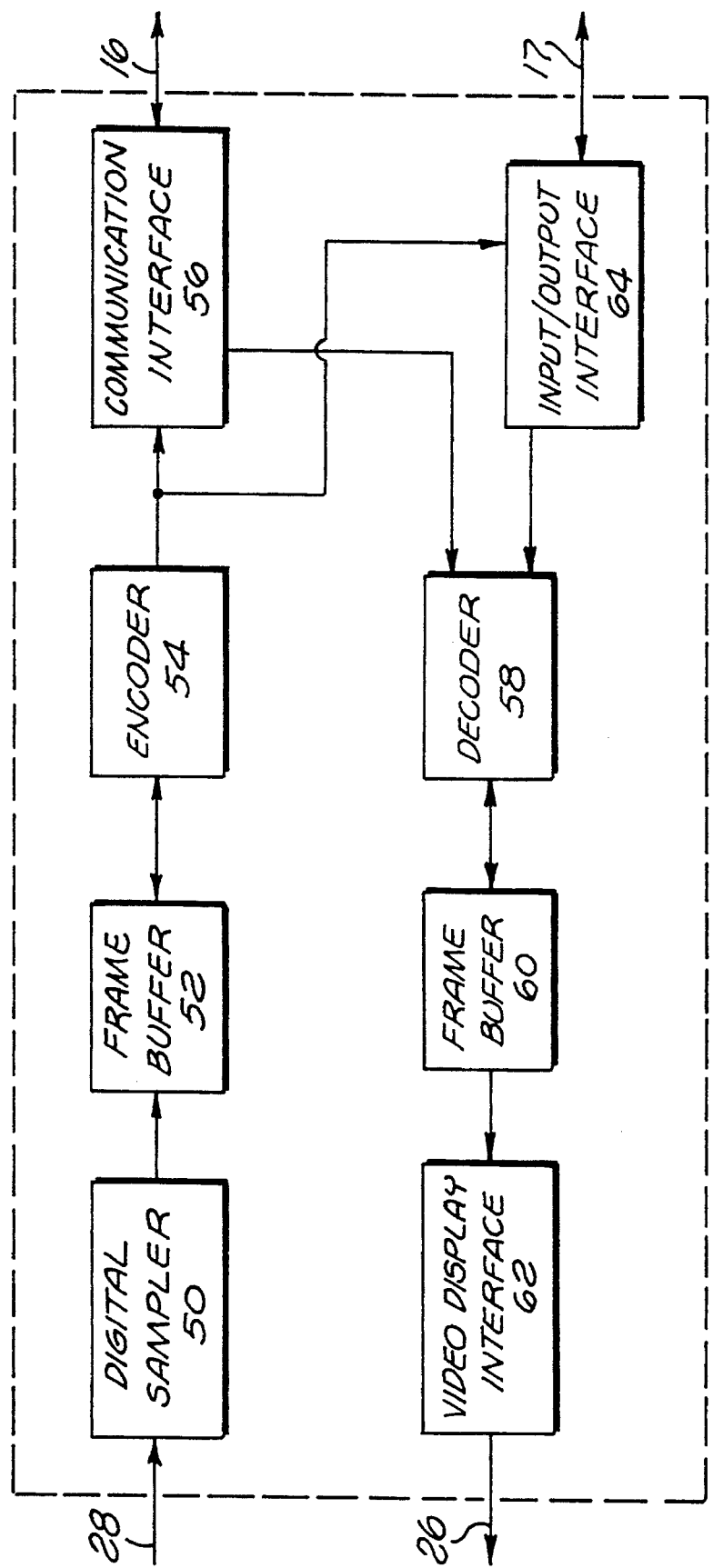
FIG. 2 illustrates a video processing system for one embodiment which includes a digital sampler, a frame buffer, an encoder, a communication interface, a decoder, a video display interface, and an input/output interface.

FIG. 2 illustrates the video processing system 20 for one embodiment. The video processing system 20 includes a digital sampler 50, a frame buffer 52, an encoder 54 and a communication interface 56. The video processing system 20 further comprises a decoder 58, a frame buffer 60, a video display interface 62, and an input/output interface 64.

The digital sampler 50 receives an analog video signal from the video camera 24 over the video signal line 28. The digital sampler 50 digitizes the incoming analog video signal and transfers the corresponding digitized video bit stream into the frame buffer 52. The digitized video bit stream in the frame buffer 52 comprises a series of video frames.

The encoder 54 reads the video frames from the frame buffer 52 and performs data compression on the video frames. A video frame being encoded by the encoder 54 is hereinafter referred to as a target video frame. A video frame used as a preceding reference frame for inter frame encoding by the encoder 54 is hereinafter referred to as a predicted frame. The encoder 54 transfers compressed video frames to the communication interface 56 for transfer over the communication link 16.

For one embodiment, the communication interface 56 performs segmentation functions on the compressed video frames from the encoder 54. The communication interface 56 thereafter transmits the packetized compressed video frames over the communication link 16 to the video system 14.

The communication interface 56 also receives compressed video communication packets over the communication link 16 from the video system 14. The communication interface 56 performs packet reassembly functions on the incoming packets and transfers the corresponding compressed video bit stream to the decoder 58 for decompression.

The input/output interface 64 accesses compressed video bit stream from the mass storage subsystem 18 via the bus 17. The input/output interface 64 transfers the compressed video bit stream to the decoder 58 for decompression.

The decoder 58 decodes the compressed video bit stream received from either the communication interface 56 or the input/output interface 64. The compressed video bit stream includes inter flames and intra frames. The compressed video bit stream from the communication interface 56 or the input/output interface 64 includes control bits for each video frame that indicate whether the corresponding video frame is an inter frame or an intra frame. The decoder 58 accordingly decodes the inter frames and intra frames and transfers the decoded video frames into the frame buffer 60.

The video display interface 62 accesses the decoded video frames from the frame buffer 60. The video display interface 62 performs digital to analog conversion functions on the decoded video frames and generates an analog video signal that drives the video display device 22 via the video signal lines 26.

The video processing system 30 is similar to the video processing system 20 and includes a digital sampler, frame buffers, an encoder, a communication interface, a decoder, and a video display interface. The video processing systems 20 and 30 enable full duplex video communication between the video systems 12 and 14 via the communication link 16.

Figures 3, 4:
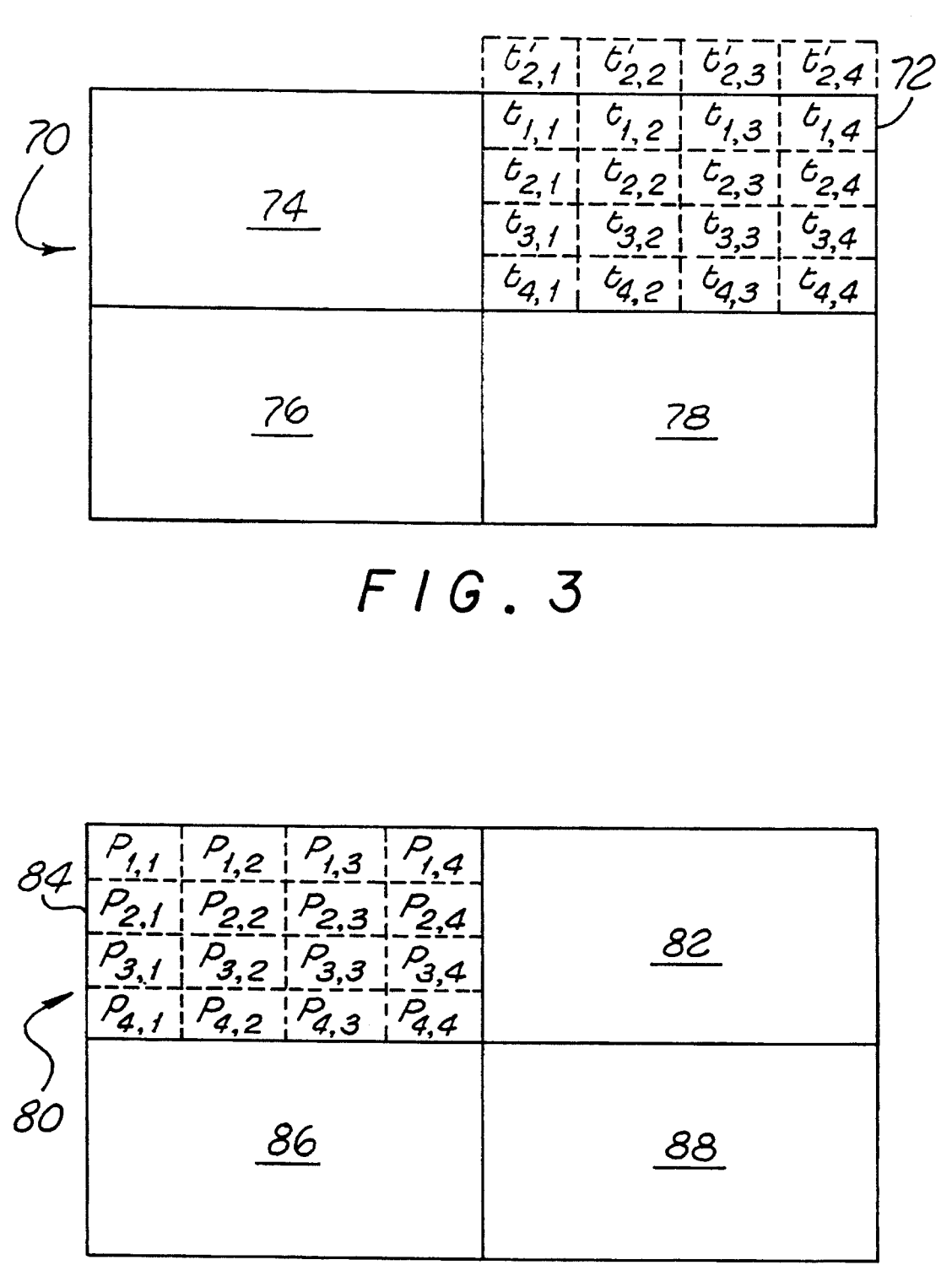

FIG. 3 illustrates a target video frame 70 stored in the frame buffer 52. The target video frame 70 is digitally sampled from the video camera 24 by the digital sampler 50. The encoder 54 subdivides the target video frame 70 into a set of target cells 72–78. The encoder 54 encodes each of the target cells 72–78. For each target cell 72–78 of an inter frame, the encoder 54 renders a decision whether to encode the target cell as an inter cell or an intra cell.

The target cell 72 comprises a set of target pixel values $t_{1,1}$ through $t_{4,4}$ for each of the Y plane, the U plane or the V plane of the target video frame 70. In general, each target cell 72–78 is comprised of an array of target pixels values $t_{1,1}$ through $t_{r,c}$ where r=the number of rows in a target cell and c equals the number of columns in a target cell. For this example, r=c=4. The 16×16 video pixel resolution illustrated by the target video frame 70 is simplified for purposes of illustration. The target video frame 70 represents higher resolution video frames.

The encoder 54 encodes the target cell 72 as an intra cell by encoding each target pixel value t1,1 through t4,4 relative to a line of pixel values located immediately above the target cell 72. In the example shown, the pixel line immediately above the target cell 72 is outside the active video display area of the video frame 70. In such a case, the encoder 54 encodes an intra cell for the target cell 72 by encoding the pixel values $t_{1,1}$ through $t_{4,4}$ relative to a line of gray level pixel values. The intra cell for the target cell 72 comprises a matrix of difference values ($t_{1,1}$—gray level) through ($t_{4,4}$—gray level).

The gray level pixel values are represented by a set of pixel values $t'_{2,1}$ through $t'_{2,4}$ which are each equal to 128 for eight bit pixels. The line of gray level pixel values is designated as row 2 for purposes of a vertical gradient determination as described below.

For another example, the encoder 54 encodes the target cell 78 relative to the pixel values $t_{4,1}$ through $t_{4,4}$ of the target cell 72.

The encoder 54 encodes the target cell 72 into an inter cell by encoding the pixel values $t_{1,1}$ through $t_{4,4}$ relative to pixel values in a corresponding predicted cell of a predicted video frame. A predicted video frame is a reconstructed version of a preceding video frame.

FIG. 4 illustrates a predicted video frame 80. The predicted video frame 80 comprises a set of predicted cells 82–88. The encoder 54 selects one of the predicted cells 82–88 to encode the target cell 72 as an inter cell. The encoder 54 selects one of the predicted cells for inter frame encoding based upon a pattern match and/or a motion estimation between the predicted video frame 80 and the target video frame 70.

The encoder 54 selects predicted cells for inter frame encoding such that the predicted cell may be in a completely different cell position as shown. In addition, a predicted cell may be offset in relation to the target cell by an amount less than the dimensions of a cell. For example, the predicted and target cells may be offset by one pixel row or pixel column or a fraction of a pixel row or pixel column.

Assume for this example that the predicted cell for the target cell 72 is the predicted cell 84. The encoder 54 generates an inter cell for the target cell 72 by encoding the pixel values $t_{1,1}$ through $t_{4,4}$ relative to pixel values $p_{1,1}$ through $p_{4,4}$ of the predicted cell 84. The inter cell for the target cell 72 comprises a matrix of difference values ($t_{1,1}-p_{1,1}$) through ($t_{4,4}-p_{4,4}$).

Figure 5:
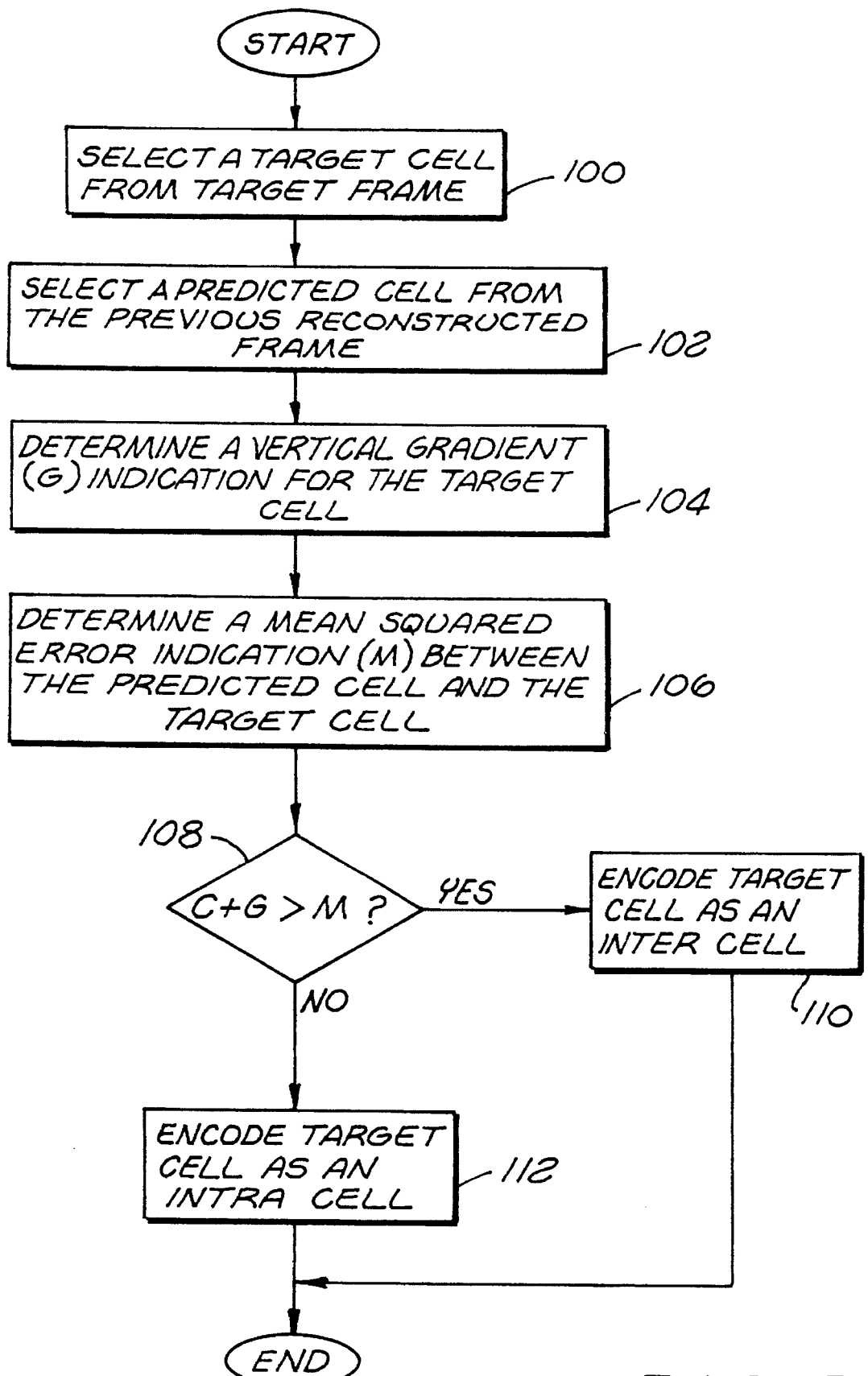
FIG. 5 illustrates a method for determining whether to encode a target cell as an inter cell or an intra cell.

FIG. 5 illustrates a method for determining whether to encode a target cell such as the target cell 72 as an inter cell or an intra cell. At block 100, the encoder 54 selects a target cell from the target frame 70. The target cell selected is the target cell 72. Thereafter at block 102, the encoder 54 selects a predicted cell from the preceding reconstructed video frame. The previous reconstructed video frame for this example is the predicted frame 80. The encoder 54 selects the predicted cell 84 as the predicted cell of the predicted frame 80 having the closest correlation to the target cell 72 according to motion estimation.

At block 104, the encoder 54 determines a vertical gradient indication (G) for the target cell 72. The vertical gradient indication is computed according to the following equation:

$$G = \sqrt{\frac{\sum_{i=1}^{r}\sum_{j=1}^{c}(t_{i,j}-t_{i-1,j})^2}{rc}}$$

where r and c represent the number of rows and columns, respectively, in the target cell 72. The term $t_{ij}$ represents the $i^{th}$ row and $j^{th}$ column of the target cell 72 where $t_{1,1}$ is the upper left hand corner.

The vertical gradient indication G uses values from the cell above the current cell in the target image. For cells touching the top of an image, the line above the top line in the image, line 0 is set to line 2 for calculating the vertical gradient indication G. The line above the top line in the image for the vertical gradient calculation G are represented in FIG. 3 by pixel values $t'_{2,1}$ through $t'_{2,4}$.

The vertical gradient indication G provides an indication of the encoding efficiency for the target cell 72 if encoded as an intra cell.

At block 106, the encoder 54 determines the encoding efficiency for the target cells 72 if encoded as an inter cell. The inter cell efficiency is indicated by a mean squared error indication (M) between the predicted cell 84 and the target cell 72. The encoder 54 determines the mean squared error indication according to the following equation:

$$M = \sqrt{\frac{\sum_{i=1}^{r} \sum_{j=1}^{c} (t_{i,j} - p_{i,j})^2}{rc}}$$

where r and c represent the number of rows and columns, respectively, in the target cell 72. The term $t_{ij}$ represents the $i^{th}$ row and $j^{th}$ column of the target cell 72 where $t_{1,1}$ is the upper left hand corner. The term $p_{ij}$ represents the $i^{th}$ row and $j^{th}$ column of the predicted cell 84 from motion estimation.

Thereafter, at decision block 108 the encoder 54 determines whether the vertical gradient indication G is sufficiently high relative to the mean squared indication M. If the vertical gradient indication G plus a predetermined constant C is greater than the mean squared error indication M at decision block 108, then control proceeds to block 110. At block 110 the encoder 54 encodes the target cell 72 as an inter cell because the vertical gradient indication is sufficiently high in comparison to the mean squared error indication, thereby indicating that an inter cell is more efficient than an intra cell.

If the vertical gradient indication G plus a predetermined constant C is not greater than the mean squared error indication M at decision block 108, then control proceeds to block 112. At block 112 the encoder 54 encodes the target cell 72 as an intra cell because the vertical gradient indication G is sufficiently low in relation to the mean squared error indication.

The intra cell encoding at block 112 is selected if the vertical gradient statistic G indicates than an intra cell is more efficient than an inter cell due to the content of the target cell 72. The vertical gradient statistic G is specifically designed to indicate the efficiency of the intra cell encoding technique described above wherein target cells are encoded relative to an adjacent line above the target cell. The constant C is selected to adjust a balance between inter cell and intra cell encoding in order to ensure that most target cells are encoded as inter cells which are generally more efficient than intra cells.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for encoding video data in a video system, comprising the steps of:

selecting a target cell of a target video frame, said target cell including a first plurality of rows and a second plurality of columns of target pixel data values, at least one of said target pixel data values corresponding to an image scene;

determining a vertical gradient measure for the target cell, said vertical gradient measure for the target cell being a square root of a ratio having (i) a numerator being a sum of sums of pixel-by-pixel differences between two adjacent rows calculated over the target cell, and (ii) a denominator being a product of a row number representing said first plurality of rows and a column value representing said second plurality of columns;

determining a vertical gradient measure for the target video frame based on said vertical gradient measure for the target cell;

determining an error measure between the target video frame and a predicted video frame;

encoding the target video frame relative to the predicted video frame, provided the vertical gradient measure is greater than the error measure; and encoding the target video frame independent of the predicted video frame, provided the vertical gradient measure is less than the error measure.

2. The method of claim 1, wherein the step of determining an error measure between the target video frame and the predicted video frame comprises the step of determining an error measure between the target cell and a predicted cell of a preceding video frame.

3. The method of claim 2, wherein the step of encoding the target video frame relative to the predicted video frame comprises the step of encoding the target cell relative to the predicted cell if the vertical gradient measure is greater than the error measure.

4. The method of claim 3, wherein the step of encoding the target video frame independent of the predicted video frame comprises the step of encoding the target cell independent of the predicted cell if the vertical gradient measure is less than the error measure.

5. The method of claim 4, wherein the error measure is a root mean squared error measure between the pixel data values of the target cell and a corresponding set of pixel data values in the predicted cell.

6. The method of claim 4, wherein the step of encoding the target cell relative to the predicted cell comprises the step of determining a difference value between each pixel data value in the target cell and the corresponding pixel data value in the predicted cell.

7. The method of claim 4, wherein the step of encoding the target cell independent of the predicted cell comprises the step of determining a difference value between each target pixel data value in the target cell and a corresponding set of pixel data values in a row of the target frame located above the target cell.

8. The method of claim 7, wherein the step of encoding the target cell independent of the predicted cell comprises the step of determining a difference value between each target pixel data value in the target cell and a row of gray level pixels if the target cell is located in a top portion of the target frame.

9. A video encoding system, comprising:

means for selecting a target cell of a target video frame, said target cell including a first plurality of rows and a second plurality of columns of target pixel data values, at lest one of said target pixel data values corresponding to an image scene;

means for determining a vertical gradient measure for the target cell, said vertical gradient measure for the target cell being a square root of a ratio having (i) a numerator being a sum of sums of pixel-by-pixel differences between two adjacent rows calculated over the target cell, and (ii) a denominator being a product of a row number representing said first plurality of rows and a column value representing said second plurality of columns;

means for determining a vertical gradient measure for the target video frame based on said vertical gradient measure for the target cell;

means for determining an error measure between the target video frame and a predicted video frame;

means for encoding the target video frame relative to the predicted video frame if the vertical gradient measure is greater than the error measure;

means for encoding the target video frame independent of the predicted video frame if the vertical gradient measure is less than the error measure.

10. The video encoding system of claim 9, wherein the means for determining an error measure between the target video frame and a predicted video frame comprises means for determining an error measure between the target cell and a predicted cell of a preceding video frame.

11. The video encoding system of claim 10, wherein the means for encoding the target video frame relative to the predicted video frame comprises means for encoding the target cell relative to the predicted cell if the vertical gradient measure is greater than the error measure.

12. The video encoding system of claim 11, wherein the means for encoding the target video frame independent of the predicted video frame comprises means for encoding the target cell independent of the predicted cell if the vertical gradient measure is less than the error measure.

13. The video encoding system of claim 12, wherein the error measure is a root mean squared error measure between the pixel data values of the target cell and a corresponding set of pixel data values in the predicted cell.

14. The video encoding system of claim 12, wherein the target cell and the predicted cell each contain a matrix comprising a plurality of rows and columns of pixel data values and wherein the means for encoding the target cell relative to the predicted cell comprises means for determining a difference value between each pixel data value in the target cell and the corresponding pixel data value in the predicted cell.

15. The video encoding system of claim 12, wherein the means for encoding the target cell independent of the predicted cell comprises means for determining a difference value between each target pixel data value in the target cell and a corresponding set of pixel data values in a row of the target frame located above the target cell.

16. The video encoding system of claim 15, wherein the means for encoding the target cell independent of the predicted cell comprises means for determining a difference value between each target pixel data value in the target cell and a row of gray level pixels if the target cell is located in a top portion of the target frame.

* * * * *

UNITED STATES PATENT AND TRADEMARK OFFICE
CERTIFICATE OF CORRECTION

PATENT NO. : 5,600,375
DATED : February 4, 1997
INVENTOR(S) : Larry Wickstrom

It is certified that error appears in the above-identified patent and that said Letters Patent is hereby corrected as shown below:

On the title page: Item [54] and Column 1, line 2, delete "Verses" and insert --Versus--

In column 5 at line 19 delete "flames" and insert --frames--

In column 8 at line 57 delete "lest" and insert --least--

Signed and Sealed this

Nineteenth Day of August, 1997

Attest:

BRUCE LEHMAN

Attesting Officer

Commissioner of Patents and Trademarks